(12) United States Patent
Deiss (10) Patent No.: US 11,174,417 B2
(45) Date of Patent: *Nov. 16, 2021

(54) SEALING TAPE ROLL OF A SEALING TAPE WITH INTERIOR BARRIER LAYERS

(71) Applicant: ISO-Chemie GmbH, Aalen (DE)

(72) Inventor: Martin Deiss, Abtsgmuend (DE)

(73) Assignee: ISO CHEMIE GmbH

( * ) Notice: Subject to any disclaimer, the term of this patent is extended or adjusted under 35 U.S.C. 154(b) by 165 days.

This patent is subject to a terminal disclaimer.

(21) Appl. No.: 16/523,201

(22) Filed: Jul. 26, 2019

(65) Prior Publication Data

US 2020/0048502 A1 Feb. 13, 2020

(30) Foreign Application Priority Data

Aug. 7, 2018 (EP) ..................................... 18187751

(51) Int. Cl.
*C09J 7/26* (2018.01)
*C09J 7/00* (2018.01)
(Continued)

(52) U.S. Cl.
CPC . *C09J 7/26* (2018.01); *C09J 7/00* (2013.01); *E04B 1/6812* (2013.01); *E06B 2001/626* (2013.01); *Y10T 428/24* (2015.01)

(58) Field of Classification Search
CPC ... C09J 7/00; C09J 7/26; C09J 2301/10; C09J 2301/12; C09J 2301/20; C09J 2301/202;
(Continued)

(56) References Cited

U.S. PATENT DOCUMENTS

| 10,801,249 | B2 * | 10/2020 | Deiss | .................... E04B 1/6812 |
| 2012/0058309 | A1 * | 3/2012 | Deiss | .................... E04B 1/6812 428/158 |
| 2013/0187348 | A1 * | 7/2013 | Deiss | ....................... F16J 15/02 277/647 |

FOREIGN PATENT DOCUMENTS

| DE | 20 2007 017267 U1 | 9/2008 | |
| EP | 2666947 A2 * | 11/2013 | ............... E06B 1/62 |

(Continued)

OTHER PUBLICATIONS

[NPL-1] Komma et al. (EP 2666947A2); Nov. 27, 2013 (EPO—Machine Translation to English). (Year: 2013).*
EP 18 18 7751 Search Report dated Feb. 5, 2019.

*Primary Examiner* — Frank J Vineis
*Assistant Examiner* — Donald M Flores, Jr.
(74) *Attorney, Agent, or Firm* — Jansson Munger McKinley & Kirby Ltd.

(57) ABSTRACT

A sealing tape roll comprises a sealing tape of flexible, compressible foam with a plurality of interior barrier layers, wherein the sealing tape is wound up into the sealing tape roll around an axis extending transversely to a longitudinal direction of the sealing tape in such a way that side surfaces of the sealing tape form end surfaces of the sealing tape roll. The sealing tape comprises a plurality of sealing tape sections, which, in an unwound state of the sealing tape, are arranged in a row in the longitudinal direction, wherein a barrier layer of the plurality of barrier layers is arranged between each pair of adjacent sealing tape sections of the plurality of sealing tape sections. The plurality of barrier layers extend over at least 50% of a width of the sealing tape roll between the opposite end surfaces of the sealing tape roll.

19 Claims, 6 Drawing Sheets

(51) Int. Cl.
*E04B 1/68* (2006.01)
*E06B 1/62* (2006.01)

(58) Field of Classification Search
CPC ............ C09J 2301/204; C09J 2301/206; C09J 2301/208; C09J 2301/21; C09J 2301/18; B29C 53/04; B32B 2307/7244; B32B 2307/7246; B32B 2307/7265; B32B 2405/00; B32B 2581/00; B32B 27/065; B32B 3/14; B32B 3/26; B32B 37/20; B32B 38/0004; B32B 5/18; B32B 7/12; E04B 1/6812; E06B 2001/626; E06B 1/62; E06B 1/64; E06B 1/66; E06B 1/68; E06B 2001/622; E06B 2001/624; E06B 2001/628; E06B 7/16–24; Y10T 428/2495; Y10T 428/24; B60J 10/70–88
See application file for complete search history.

(56) References Cited

FOREIGN PATENT DOCUMENTS

| | | |
|---|---|---|
| EP | 2 990 551 A1 | 3/2016 |
| EP | 3 346 068 A1 | 7/2018 |

* cited by examiner

SEALING TAPE ROLL OF A SEALING TAPE WITH INTERIOR BARRIER LAYERS

FIELD OF THE INVENTION

The present invention relates to a sealing tape roll of a sealing tape of flexible, compressible foam with a plurality of interior barrier layers.

Sealing tapes are used to seal joints between a frame profile, such as that of a window or a door, and a building wall to seal off the joint against air drafts and driving rain. Such sealing tapes are usually wound up into sealing tape rolls under compression for space-saving storage, for transport, and for easier handling during installation. In addition to the permeability to air and the sealing property against driving rain, the resistance of the sealing tape to the diffusion of water vapor is considered one of the substantial properties of a sealing tape. It is generally the diffusion of water vapor in the functional direction of the sealing tape, i.e., in the direction between the interior and exterior sides of the joint to be sealed, which is considered so as to define a diffusion gradient between the interior and exterior sides of the room. To influence the diffusion of water vapor through the sealing tape, at least one barrier layer has been provided on at least one of the side surfaces of the sealing tape or within the sealing tape parallel to these surfaces. In an installed state of the sealing tape, this barrier layer extends over the entire cross section of the joint between the frame profile and the building wall. A barrier layer of this type has greater resistance to the diffusion of water vapor than the foam of the sealing tape and is therefore able to reduce the diffusion of water vapor through the sealing tape or to create a diffusion gradient between the interior side and the exterior side of the room.

It has been found that the permeability of a sealing tape with respect to water vapor should be considered over relatively long lengths of the sealing tape. Local differences in the water vapor diffusion resistance of the sealing tape, such as those which can readily occur as a result of manufacturing-related situations, for example, lead to the diffusion of water vapor within the sealing tape in a direction toward areas of lower water vapor diffusion resistance. Such diffusion in the add in the longitudinal direction of the sealing tape leads to the result that the diffusion of water vapor through the sealing tape is undesirably high in comparison to that of a completely homogeneous sealing tape and can deviate from predetermined nominal values. The same applies to the permeability to air in a similar manner.

SUMMARY OF THE INVENTION

It is an object of the present invention to provide a sealing tape wound up into a sealing tape roll with reliably adjustable water vapor diffusion resistance.

According to an aspect of the present invention, a sealing tape roll comprises a sealing tape of flexible, compressible foam with a plurality of interior barrier layers. The sealing tape comprises a top surface, a bottom surface, and two side surfaces connecting the top surface and the bottom surface to each other. The sealing tape also comprises a longitudinal direction, which is parallel to the bottom surface and to the side surfaces. The sealing tape is wound up into the sealing tape roll around an axis transverse to the longitudinal direction of the sealing tape in such a way that the top surface of one turn rests against the bottom surface of an adjacent turn of the sealing tape roll, and the side surfaces of the sealing tape form end surfaces of the sealing tape roll. A width of the sealing tape roll is defined as a distance between one end surface of the sealing tape roll and the opposite end surface. The sealing tape also comprises a plurality of sealing tape sections, which, in an unwound state of the sealing tape, are arranged in a row in the longitudinal direction, wherein a barrier layer of the plurality of barrier layers is arranged between each pair of adjacent sealing tape sections of the plurality of sealing tape sections. Each of the plurality of barrier layers extends over at least 50% of the width of the sealing tape roll between the opposite end surfaces of the sealing tape roll.

Thus a sealing tape wound up into a sealing tape roll is provided, which tape comprises barrier layers which extend substantially over a large portion, preferably over the entire cross section, of the sealing tape, transversely to its longitudinal direction. As a result, the barrier layers form sealing tape sections, arranged in a row in the longitudinal direction of the sealing tape, wherein adjacent sealing tape sections are separated from each other by an intermediate barrier layer. The barrier layers arranged in a row in the longitudinal direction of the sealing tape thus influence the diffusion of water vapor and/or the permeability to air within the sealing tape in the longitudinal direction of the tape. Inhomogeneities in the foam material of the sealing tape therefore have at best only a local effect. The diffusion of water vapor within the sealing tape in the longitudinal direction of the sealing tape can be prevented at least to a significant degree.

The plurality of barrier layers therefore extend over at least 50%, preferably over at least 75%, and more preferably over at least 90% of the width of the sealing tape roll between the opposite end surfaces of the sealing tape roll. The larger the area over which the plurality of barrier layers extend between the end surfaces of the sealing tape roll and thus between the side surfaces of the sealing tape, the more complete the separation of the sealing tape sections arranged behind each other in the longitudinal direction. The diffusion of water vapor within the sealing tape in the longitudinal direction of the sealing tape can thus be increasingly reduced. In particular, water vapor is increasingly prevented from diffusing around the plurality of barrier layers. The plurality of barrier layers may begin from one end surface of the sealing tape roll and extends toward the opposite end surface. The plurality of barrier layers, however, can also extend between the end surfaces of the sealing tape roll in such a way that lateral edges of the barrier layers, i.e., the edges facing the end surfaces of the roll, both are a certain distance away from those end surfaces. In a preferred embodiment, the plurality of barrier layers extend continuously from one end surface of the sealing tape roll to the opposite end of the sealing tape roll.

Sealing tape rolls also comprise the advantages of space-saving storage, ease of transport, and ease of handling the sealing tapes. The sealing tape is preferably wound up under compression into the sealing tape roll. The compressed thickness of the sealing tape is preferably less than 25% of the original thickness of the foam. In preferred embodiments, the sealing tape comprises a compressed thickness of less than 20%, even more preferably of less than 15%, and/or of greater than 5% of the original thickness of the foam.

In an expanded state, the sealing tape preferably comprises a substantially rectangular cross section, wherein a width of the sealing tape is defined as a distance between the side surfaces of the sealing tape, a thickness of the sealing tape is defined as a distance between the top surface and the bottom surface of the sealing tape, and a length of the sealing tape is defined as a distance in the longitudinal direction. In a cross section perpendicular to the longitudinal direction, the top and bottom surfaces form wide sides, and the side surface form, in this cross section, narrow sides of the sealing tape. The length of the sealing tape is considerably greater than its width and its thickness. Because the side surfaces of the sealing tape form the end surfaces of the sealing tape roll, the width of the sealing tape roll is substantially the same as the width of the sealing tape. Minor deviations can result from the fact that the side surfaces, after having been wound up under compression into the sealing tape roll, bulge slightly outward. Such deviations will not be taken into account when the range (in %) is stated over which the plurality of barrier layers extend over the width of the sealing tape and of the sealing tape roll. If the plurality of barrier layers extend over the entire width of the sealing tape roll, they also extend over the entire width of the sealing tape and vice versa.

An "installed state" of the sealing tape is defined as the state in which the sealing tape is arranged in a joint between a frame element such as a window or door frame and a building wall. The longitudinal direction of the sealing tape then extends around the peripheral joint, and the sealing tape lies flat by its bottom and top surfaces against the frame element and the building wall. One of the side surfaces of the sealing tape is then facing the interior side of the room, and the opposite side surface is facing the exterior side of the room. The functional direction of the sealing tape is defined as the direction in which the sealing tape insulates and seals off the interior side of the room against the exterior side in the area of the joint. The functional direction is therefore perpendicular to the side surfaces and parallel to the bottom surface of the sealing tape and extends from the interior side of the room to the exterior side. The functional direction is therefore perpendicular to the longitudinal direction of the sealing tape and perpendicular to the thickness direction of the sealing tape.

According to an aspect of the invention, the plurality of interior barrier layers extend transversely to the longitudinal direction of the sealing tape and are thus parallel to the functional direction of the sealing tape. More precisely, a straight line which is parallel to the longitudinal direction of the sealing tape intersects a plane which is parallel to the barrier layer. The straight line preferably intersects the plane at an angle of 90°.

According to a preferred embodiment, the sealing tape of the sealing tape roll also comprises barrier layers which cover at least one side surface of the sealing tape and/or are arranged parallel to the side surfaces in the interior of the sealing tape and extend in the longitudinal direction of the sealing tape. Such interior, longitudinally-extending barrier layers divide the sealing tape into a plurality of sealing tape strips arranged next to each other transversely to the longitudinal direction.

In an advantageous embodiment, the sealing tape comprises a drainage layer for collecting and effectively discharging water from the sealing tape. Water which arrives in the sealing tape undesirably as a result of driving rain, for example, can thus be conducted back out of the sealing tape. A wet sealing tape or a wet region of the sealing tape would lead to a disadvantageous increase in thermal conductivity and correspondingly to a lower degree of thermal insulation by the sealing tape. The drainage layer can comprise a foam strip or can be formed by a barrier layer, preferably a barrier layer parallel to the side surfaces of the sealing tape.

For example, a barrier layer can be configured with multiple plies, wherein one ply forms a drainage layer, which is adapted to conducting intruding water away. The drainage layer can comprise, for example, a membrane or a nonwoven layer. The drainage layer, however, can also be formed by a foam. The sealing tape then comprises, for example, at least three sealing tape strips arranged next to each other transversely to the longitudinal direction, wherein at least one of these sealing tape strips, preferably an interior sealing tape strip, is configured as a drainage layer. The drainage layer then comprises an at least predominantly open-cell foam, which takes up water and can conduct it away through the open pores by the force of gravity. At the same time, through the use of a foam, the insulating properties of the sealing tape suffer almost no negative effect. In addition, the drainage layer can also comprise a nonwoven layer here as well.

In a preferred embodiment at least one barrier layer is provided which extends from one end surface of the sealing tape roll toward the opposite end surface of the sealing tape roll and in the longitudinal direction of the sealing tape to reduce the size of the areas of the sealing tape in which inhomogeneities of the sealing tape exert a disadvantageous effect on the water vapor diffusion resistance. This additional barrier layer is parallel to the bottom surface of the sealing tape. The additional barrier can be provided as an alternative or in addition to the barrier layer extending in the longitudinal direction parallel to the side surfaces of the sealing tape.

The at least one additional barrier layer is substantially perpendicular to the side surfaces of the sealing tape and parallel to the bottom surface of the sealing tape. The at least one additional barrier layer is arranged within the sealing tape and subdivides the sealing tape into sealing tape plies lying one above the other in the thickness direction. It is also preferred that the at least one additional barrier layer, in the unwound state of the sealing tape, be perpendicular to the barrier layer parallel to the side surfaces and perpendicular to each of the plurality of barrier layers being arranged behind each other in the longitudinal direction. If the at least one barrier layer extending in the longitudinal direction is also perpendicular to each of the plurality of barrier layers arranged behind each other in the longitudinal direction, as is preferred, the sealing tape will in this way be divided into substantially cubical or block-like sections.

The plurality of barrier layers, which are arranged behind each other in the longitudinal direction, are preferably perpendicular to the bottom surface and to the side surfaces, so that they are oriented axially relative to the sealing tape roll. If the sealing tape has a rectangular cross section, the plurality of barrier layers are also perpendicular to the top surface. A sealing tape which can be wound up into a sealing tape roll and in which the barrier layers are perpendicular to the side surfaces can be manufactured very easily. If the barrier layers extend axially relative to the sealing tape roll, it is guaranteed that, after installation of the sealing tape with the bottom surface of the sealing tape attached to a frame element or to the building wall, the barrier layers will, as desired, extend between the interior side of the room and the exterior side.

In an alternative embodiment, the plurality of barrier layers, in the unwound state of the sealing tape, are arranged at a slant to the top surface and to the bottom surface and are perpendicular to the side surfaces. In another alternative embodiment, the plurality of barrier layers, in the unwound state of the sealing tape, are perpendicular to the bottom surface but at a slant to the side surfaces. In yet another alternative embodiment, the plurality of barrier layers are, in the unwound state of the sealing tape, at a slant to the top surface, to the bottom surface, and to the side surfaces. In all these embodiments, however, the plurality of barrier layers extend from one side surface of the sealing tape to the opposite side surface of the sealing tape or from one end surface of the sealing tape roll to the opposite end surface of the sealing tape roll. In this way, it is possible for the individual sealing tape sections formed between the barrier layers to be given different characteristics and for the diffusion properties of the sealing tape to be varied in a larger number of ways.

The plurality of barrier layers preferably extend only part of the way between the top surface and the bottom surface of the sealing tape. Between the top surface or bottom surface of the sealing tape and the barrier layers there then remains, for example, a foam bridge. To guarantee that adjacent sealing tape sections are sealed off from each other, however, the plurality of barrier layers preferably extend over the greater part of the thickness of the sealing tape, and the foam bridge is thin. A foam bridge preferably has a maximum thickness of 10 mm, more preferably of 5 mm, and even more preferably of 2 mm. This makes it easy to produce the sealing tape and at the same time avoids any unwanted damage to the barrier layer material. In addition, the cohesion of the sealing tape in the longitudinal direction is guaranteed even if the optional step of bonding the individual sealing tape sections together by the plurality of barrier layers is not performed.

In an alternative embodiment, the plurality of barrier layers extend continuously from the top surface to the bottom surface of the sealing tape. This offers the advantage that each pair of adjacent individual sealing tape sections is separated completely by an intermediate barrier layer, and diffusion around the barrier layers in the longitudinal direction of the sealing tape is completely impossible. In alternative embodiments, some of the barrier layers may extend continuously from the top surface to the bottom surface of the sealing tape and other barrier layers may extend only part of the way between the top surface and the bottom surface of the sealing tape.

In a preferred embodiment, at least one barrier layer comprises two barrier layer sections, wherein each barrier layer section rests flat against one of the sealing tape sections adjacent to the barrier layer. The two barrier layer sections can be adhered to each other. The two barrier layer sections can also be fused together or attached to each other in any other way. It is obvious that, in particular if at least certain areas of the barrier layer sections are fused together, the two barrier layer sections can form a unit, in which case it may be impossible in an area of this type to distinguish the individual barrier layer sections from each other afterwards.

Alternatively or in addition to the adhesion or fusing of the two barrier layer sections, the two barrier layer sections can each form a leg of the at least one barrier layer, and the two legs can be connected to each other by a connecting section of the at least one barrier layer. The connecting section is preferably configured as an integral part of the two barrier layer sections and is created by the deforming a barrier layer. In particular, the connecting section is created by folding, bending or creasing a flat barrier layer along a line, so that it forms two legs, each of which forms a barrier layer section, there also being a connecting section which connects these legs to each other.

The connecting section of the at least one barrier layer comprising two barrier layer sections is then preferably configured with a U-shape or a V-shape and is arranged in the area of the top surface or the bottom surface of the sealing tape. The U-shape or V-shape is obtained by folding over, bending or creasing the barrier layer. Even if a connecting section is provided, the legs or barrier layer sections of the at least one barrier layer can be bonded together. The apex of a U-shape or V-shape of the connecting section of the barrier layer extends along a straight line, which is parallel to the functional direction of the sealing tape, that is, transverse to the longitudinal direction of the sealing tape.

The connecting section being arranged in the area of the top surface or the bottom surface of the sealing tape indicates that it is very close to the top surface or bottom surface. Thus, for example, an apex of the connecting section, i.e., an outermost edge area of the connecting section, can coincide with the top surface or bottom surface or can lie just outside the sealing tape. The foam strips of the sealing tape adjacent to such a barrier layer are then completely separated from each other. In particular for production-related reasons, however, it is preferred that a narrow foam bridge remains, as described above, between the connecting section or the apex of that section and the top or bottom surface of the sealing tape in whose vicinity the connecting section is arranged.

To make it as easy as possible to produce the sealing tape roll, each of at least two barrier layers of the plurality of barrier layers comprises two barrier layer sections and one connecting section, and the connecting sections of the at least two barrier layers succeeding each other in the longitudinal direction of the sealing tape are arranged in alternation in the area of the top surface and in the area of the bottom surface of the sealing tape. As a result, the sealing tape to be wound up into a sealing tape roll is particularly easy to produce by folding over individual sealing tape sections in opposite directions, as can be derived from the following description under reference to the figures.

In an embodiment which can be produced particularly efficiently, at least one barrier layer which has only one barrier layer section extending preferably continuously from the top surface to the bottom surface of the sealing tape is arranged between the at least two barrier layers comprising two barrier layer sections and a connecting section.

It is preferred that the barrier layers, in the unwound state of the sealing tape, be parallel to each other. The barrier layers, furthermore, are preferably arranged at the same distance from each other in the longitudinal direction of the sealing tape. This guarantees that all of the sealing tape sections have the same properties, and a sealing tape which is as homogeneous as possible with respect to its sealing and insulating properties is obtained. The barrier layers, however, can also be arranged at a slant to each other, be arranged in different distances from each other, and/or have different material properties.

According to a preferred embodiment, the barrier layers described herein are made of a film-like material or an adhesive, in particular of a film strip, an adhesive strip, or an adhesive-like fluid medium. Such barrier layer materials can be applied and bonded easily to the foam of the sealing tape and can be readily inspected. In addition, these materials are particularly suitable for use as barrier layer material because their sealing properties can be effectively adjusted as desired.

For example, the barrier layers described herein are made of a film-like material such as a film of polyamide, polyurethane, polypropylene, or copolymers of these. The barrier layers described herein can also be formed by an adhesive, such as a dispersion adhesive, in particular an acrylate adhesive. All barrier layers can consist of the same material or can consist of different materials.

The barrier layers can also be configured with the property of "humidity variability"; that is, their resistance to the diffusion of water vapor changes as a function of the atmospheric humidity of the environment of the barrier layer. The so-called "sD" value is characteristic of the water vapor diffusion resistance, it is the water vapor diffusion value relative to the thickness of a layer of air in meters.

A barrier layer preferably has an sD value in the range of 0.05-100 m, more preferably of 0.1-25 m or of 0.2-15 m (at 25% relative humidity (RH)). Verifying the sD value is carried out in accordance with DIN EN ISO 12572:2001. Independently of this or combination with it, a barrier layer can have an sD value of 0.02-10 m or of 0.03-6 m or of 0.05-2 m at 72.5% RH according to DIN EN ISO 12572: 2001. For example, the sD value can be in the range of 1-10 m at 25% RH and in the range of 0.1-5 m at 72.5% RH. Unless otherwise specified by DIN EN ISO 12572:2001, the sD values are based on a temperature of 20° C.

The sD value of a barrier layer at 25% RH preferably differs from the sD value at 72.5% RH (at 20° C. in each case) by a factor of ≥1.1-1.2, preferably of ≥1.5-2, possibly up to a factor of 3-5 or of up to 10-20 or even by a factor of up to 50 or up to 100 or 150 or more. In this way, the dependence of the water vapor diffusion of the barrier layer on the atmospheric humidity is defined. The difference between the two sD values of the barrier layer at the two indicated relative humidities can be ≥0.25 m or ≥0.5 m or preferably ≥0.75-1 m; it can, for example, be up to 5-10 m or up to 20-25 m or more. As a result, an adequate dependence of the water vapor diffusion resistance, i.e., a dependence sufficient to ensure adequate adaptation of the water vapor diffusion resistance to the environmental conditions can be achieved even under widely varying environmental conditions, such as in summer or in winter or in different climate zones. The sD value at 25% RH is preferably higher in each case than the value at 72.5% RH.

The barrier layers preferably consist at least partially of a synthetic, water-swellable polymer.

A barrier layer comprises a thickness in the range between 1 μm and 1 mm, preferably a thickness of 1-500 μm or of 20-250 μm, more preferably a thickness in the range of 5-100 μm or of 5-50 μm.

The barrier layers can also be configured with multiple plies, in particular as a multi-ply composite layer. For example, at least one ply of at least one additional material can be arranged on one or both sides of a functional layer. The one additional ply or both additional plies, each of which covers the functional layer either partially or completely, can protect this layer, carry or support it, and increase the stability of the barrier layers. The individual plies can consist of the same material or of different materials.

The plies arranged on one or both sides can be in particular nonwovens, fabric, or mesh of inert materials such as polyethylene, polyurethane, polypropylene, polyester, glass fibers, or viscose, possibly even perforated films, in particular films of polyethylene, polyurethane, polypropylene, or polyester. The layers can generally consist of any suitable material which is available in the form of layers and the sD value of which is preferably not higher than that of the functional layer. The plies arranged on one or both sides can consist of a dispersion adhesive, in particular of an acrylate adhesive.

The thickness of the layers of the barrier layers enclosing the functional layer can have, per side and independently of each other, an overall thickness of 10-2,000 μm, preferably of 10-500 μm, more preferably of 10-250 μm, even more preferably of 10-90 μm.

Generally, the barrier layers preferably form a continuous, nonporous, and non-perforated layer, which preferably is at least substantially impermeable to air. The air permeability of the barrier layers or barrier plies is preferably in the range of 0.01-50 $l/(m^2s)$, more preferably in the range of 0.01-20 $l/(m^2s)$. In a preferred embodiment, the air permeability is ≤3-6 $l/(m^2s)$ or preferably ≤1-2 $l/(m^2/s)$ or ≤0.2-0.5 $l/(m^2s)$ or more preferably ≤0.1-0.3 $l/(m^2s)$ according to DIN EN ISO 9237; test area=100 $cm^2$ at a measurement pressure (negative pressure) of 1.0 mbar; test unit: Frank 21443; or is not measurable anymore.

The crucial point with respect to the permeability of a sealing tape section to air is generally the overall reduction of the air flow in one direction across the entire cross section of the sealing tape section. If, for example, a plurality of barrier layers and sealing tape plies or strips are arranged in alternation in the thickness direction or in the functional direction of the sealing tape, the reduction of the air flow through all these barrier layers and sealing tape strips must be taken into account. The air permeability of the overall sealing tape in the functional direction is preferably less than 50 $l/(m^2s)$, more preferably less than 30 $l/(m^2s)$, under the above-indicated measurement conditions.

In one embodiment, the sealing tape or the sealing tape roll also comprises an additional material, which is applied to a surface of the sealing tape or to the plurality of barrier layers or is contained in the impregnation agent of the foam. The additional material can give the sealing tape special properties. Additional materials which can be considered for use include in particular materials for fire protection (e.g., expandable graphite, incombustible solids, $CO_2$ emitters, etc.), materials for insulation (e.g., polyurethane foam, resins, sealants, etc.), materials for sealing against moisture (e.g., hydrophobic or hydrophilic substances, substances which swell upon contact with water, etc.), materials for sound damping, materials for controlled venting (e.g., catalysts, etc.), materials for hygienic purposes (e.g., disinfectants, etc.), and/or materials for initiating the expansion of the sealing tape (e.g., blowing agents, heat sources, etc.). With respect to the arrangement, the type, and the properties of the additional material, the skilled person will be familiar with alternatives which can be used to satisfy the requirements in a specific case.

The foam of the sealing tape can be made of any desired open-cell or closed-cell flexible foam such as that made of polyurethane, polyethylene, polyvinyl chloride, or polypropylene, and it can be impregnated to delay its recovery after compression. The density of these types of flexible foams is in the range of 20-200 $kg/m^3$.

If adjacent sealing tape strips are formed, these preferably consist of the same material. Alternatively, the sealing tape strips can be made of different materials. The sealing tape sections are preferably also formed of the same material, but can also be made of different materials.

The flexible foam preferably comprises a compression hardness of more than 2 kPa. The compression hardness is preferably more than 2.1 kPa, more preferably more than 2.2 kPa, and even more preferably more than 2.3 kPa. The compression hardness is preferably less than 4 kPa, more preferably less than 3.8 kPa, and even more preferably less than 3.6 kPa. The compression hardness is a measure of the strength of the foam. The values given herein are based on a compression of 40% versus the original thickness. The compression hardness is determined according to DIN EN ISO 3386; the CV40 value is given.

The sealing tapes are preferably impregnated at least partially and preferably completely with an impregnation agent to delay their recovery. The impregnation agent preferably comprises an acrylate dispersion. In an advantageous embodiment, the acrylate dispersion comprises acrylate polymer particles dispersed in a homogeneous phase. It is particularly preferable for the foam to be impregnated with a certain weight-percentage of acrylate dispersion for delayed recovery in such a way that, at 20° C. and 50% relative humidity, the sealing tape expands from a sealing tape compression of about 9-13% to the point where it seals the joint in less than 24 hours.

A foam which has been impregnated to delay its recovery preferably comprises an air permeability in the range of 50-1,000 l/(m²s), more preferably in the range of 60-600 l/(m²s), and even more preferably in the range of 80-400 l/(m²s). The data on air permeability given within the scope of the present application are based on determinations according to DIN ISO 9237 under the standard conditions of a 10-mm-thick foam piece (completely expanded) at a negative measurement pressure of 1.0 bar over a test surface of 100 cm² by the use of a Frank 21443 device.

Finally, it is advantageous for the bottom surface of the sealing tape to comprise an adhesive layer for attaching the sealing tape to a frame element. The adhesive layer will therefore be arranged transversely to the plurality of barrier layers. In the state, in which the sealing tape is wound up into a roll, the bottom surface of the sealing tape is oriented radially outwardly. The sealing tape can thus be unrolled along a frame element and be rapidly attached to it by the adhesive layer. The adhesive layer is preferably configured as double-sided adhesive tape, which is covered on the external side by a peel-off protective film. The adhesive layer can also, in addition or alternatively, be configured on the top surface of the sealing tape. The adhesive layer also increases or establishes the cohesion of the sealing tape sections.

DETAILED DESCRIPTION OF SPECIFIC EMBODIMENTS

Figure 1:
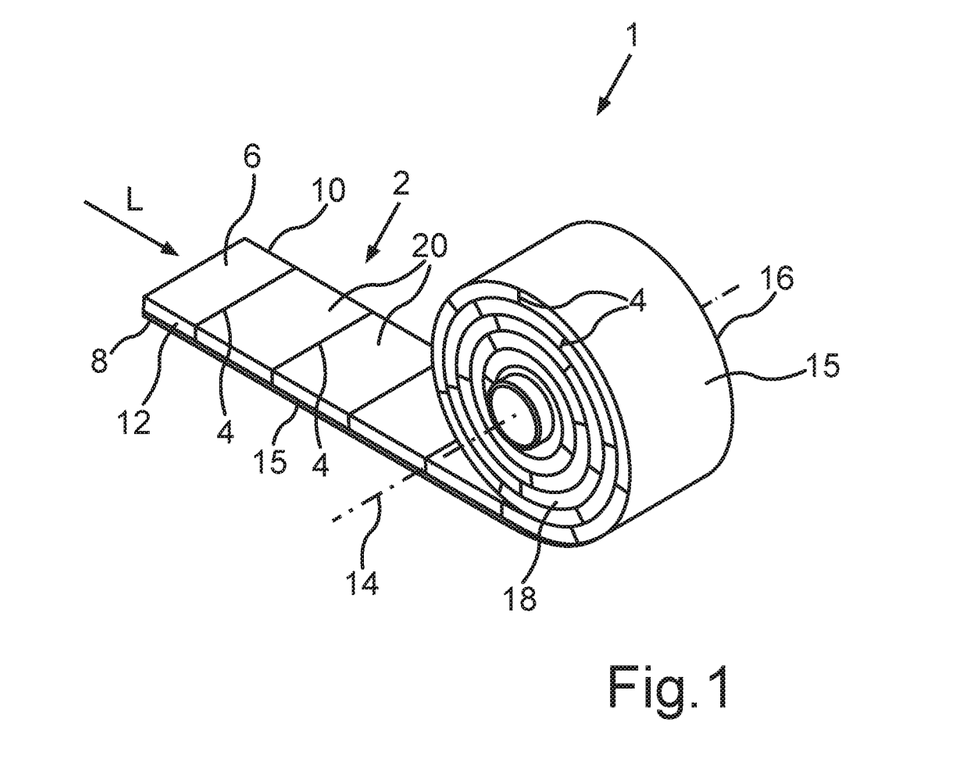
FIG. 1 shows an isometric view of a preferred embodiment of the sealing tape roll according to the invention.

FIG. 1 shows an isometric view of a sealing tape roll 1 according to an embodiment of the present invention. The sealing tape roll 1 comprises a wound-up sealing tape 2. The sealing tape 2 in FIG. 1 is shown in a state in which it has been partially unwound so that its components can be more easily seen, wherein it is the end of the sealing tape 2 at the outer end of the sealing tape roll 1 which is not wound up onto the sealing tape roll 1. In the embodiment shown, the sealing tape 2 has been impregnated to delay its recovery, and it has not yet returned from a compressed state to an expanded state in the direction perpendicular to a longitudinal direction L of the sealing tape 2 after it has been partially unwound. A thickness of the sealing tape 2 in the expanded state is usually 2-times to 20-times the thickness of the sealing tape 2 in the compressed state of the sealing tape roll 1.

The sealing tape 2 consists of flexible, compressible foam and comprises a plurality of internal barrier layers 4. In addition, the sealing tape 2 comprises a top surface 6, a bottom surface 8, and two side surfaces 10, 12 connecting the top surface 6 and the bottom surface 8 to each other. The longitudinal direction L of the sealing tape 2 is parallel to the bottom surface 8 and to the side surfaces 10, 12. In the unwound state of the sealing tape 2, the tape lies on a flat surface, for example, on an external surface of a frame element, wherein, in this state, the side surfaces 10, 12 are perpendicular to the top surface 6 and to the bottom surface 8, and the sealing tape 2 is in a completely expanded state. The sealing tape 2 is preferably wound up under compression into the sealing tape roll 1 to allow the sealing tape rolls 1 to be stored in less space. In the compressed state of the sealing tape 2, the side surfaces 10, 12 have a smaller height in the expanded state of the sealing tape 2. That is, the thickness of the sealing tape or distance between the top surface 6 and the bottom surface 8 in the compressed state is less than that in the expanded state. The distance between the side surfaces 10, 12 remains substantially unchanged upon compression of the sealing tape 2.

The sealing tape 2 is wound up into the sealing tape roll 1 around an axis 14, which is perpendicular to the longitudinal direction L. The axis 14 is also perpendicular to the side surfaces 10, 12 of the sealing tape 2. In the sealing tape roll 1, the top surface 6 of one turn rests against the bottom surface 8 of an adjacent turn of the sealing tape roll 1, and the side surfaces 10, 12 of the sealing tape 2 form end surfaces 16, 18 of the sealing tape roll 1. The sealing tape 2, furthermore, is wound up into the sealing tape roll 1 in such a way that the bottom surface 8 is oriented radially toward the outside relative to the axis 14 or to the sealing tape roll 1, whereas the top surface 6 of the sealing tape 2 is oriented radially toward the inside. A circumferential surface of the sealing tape roll 1 therefore comprises the bottom surface 8 of the outermost turn of the sealing tape 2 of the sealing tape roll 1.

The bottom surface 8 of the sealing tape 2 preferably comprises an adhesive layer 15 for attaching the sealing tape 2 to a frame element. For example, adhesive layer 15 can be formed by double-sided adhesive tape, which is fastened to the bottom surface 8 of the sealing tape 2 by an adhesive surface, whereas the opposite adhesive surface of the adhesive tape, i.e., the surface facing away from the bottom surface 8, is covered by a cover layer to protect the adhesive surface and to prevent the individual turns of the sealing tape roll 1 from sticking to each other. To install the sealing tape 2, this cover layer must be peeled off the adhesive layer in sections, so that the sealing tape roll 1 can then be unrolled along an external surface of a frame element. The cover layer consists, for example, of silicone paper. The bottom surface 8 of the sealing tape 2 is attached to the frame element by the adhesive layer 15. It is also possible to cut off sealing tape strips of the required length from the sealing tape roll 1 first and then to attach them to the frame element.

The sealing tape 2 comprises a plurality of sealing tape sections 20, which, in the unwound state of the sealing tape 2, are arranged in a row behind each other in the longitudinal direction L. Between each pair of adjacent sealing tape sections 20 of the plurality of sealing tape sections 20, a barrier layer 4 of the plurality of barrier layers 4 is arranged. Water vapor is therefore only able to diffuse in the longitudinal direction L of the sealing tape 2 substantially only through the plurality of barrier layers 4.

Figure 6A:
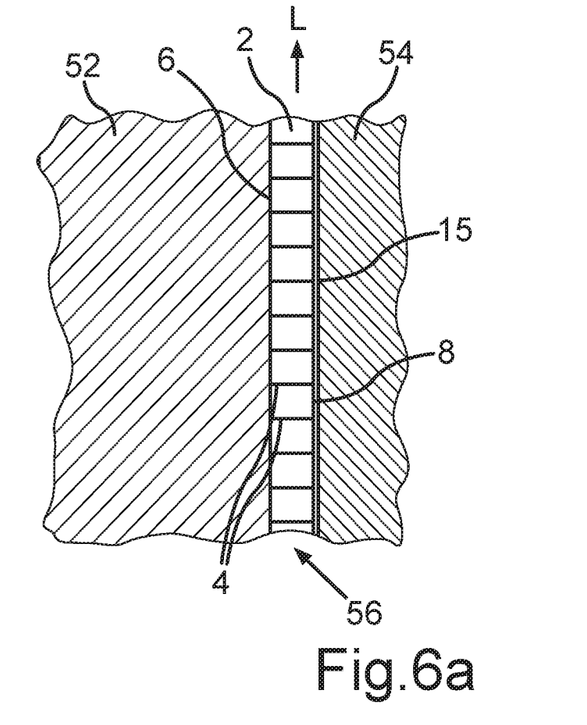
FIGS. 6a, 6b show two different cross-sectional views of a sealing tape of an embodiment of the sealing tape roll according to the invention in an installed state.
Figure 6B:
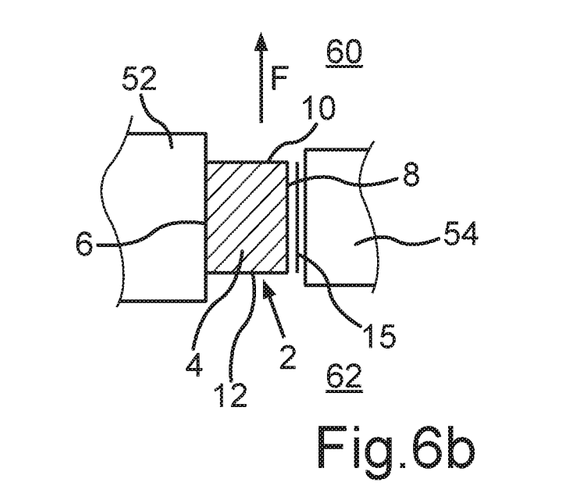

In the sealing tape roll 1, the plurality of barrier layers 4 extend between one end surface 16 and the opposite end surface 18 of the sealing tape roll 1, preferably continuously from the end surface 16 to the opposite end surface 18. Consequently, after the sealing tape 2 has been installed in the conventional and intended manner, in which the bottom surface 8 of the sealing tape 2 is attached to an outside surface of a frame element, the barrier layers 4 extend between the frame element and a building wall, which form between them the joint to be sealed. The barrier layers 4 also extend between the interior side of the room and the exterior side, but they do not extend along the joint in the longitudinal direction of the sealing tape 2, as will be described in detail below with reference to FIG. 6.

The plurality of barrier layers 4 can also extend over only part of the width of the sealing tape roll 1 between the end surfaces 16, 18. To achieve the desired effect, the plurality of barrier layers 4 extend over at least 50% of the width of the sealing tape roll 1 and of the sealing tape 2. Each barrier layer 4 can, for example, be arranged either centrally or off-center between the side surfaces 10, 12. Alternatively, each barrier layer 4 can begin from one of the side surfaces 10, 12 and proceed toward the other side surface 10, 12. Between at least one edge of the plurality of barrier layers 4 facing a side surface 10, 12 and the corresponding side surface 10, 12, there then remains an area without a barrier layer and through which water vapor can diffuse substantially without hindrance. Any such area should therefore be as small as possible. The barrier layers 4 thus extend over at least 50%, preferably over at least 75%, and even more preferably over at least 90% of the width of the sealing tape 2 between the side surfaces 10, 12.

In the preferred embodiment according to FIG. 1, the plurality of barrier layers 4 are perpendicular to the top surface 6, to the bottom surface 8, and to the side surfaces 10, 12. The barrier layers 4 thus extend axially through the sealing tape roll 1. More precisely, each barrier layer 4 forms a plane, which has a radial and an axial component relative to the sealing tape roll 1 and its axis 14.

The barrier layers 4 are illustrated in FIG. 1 to extend continuously from the top surface 6 to the bottom surface 8 of the sealing tape 2. Because the barrier layers 4 also extend all the way from the left side surface 10 to the right side surface 12, the sealing tape 2, in a cross section through one of the barrier layers 4, consists only of the corresponding barrier layer 4. In this case, water vapor can diffuse in the longitudinal direction L within the sealing tape 2 only through individual barrier layers 4. The diffusion of water vapor within the sealing tape 2 in the longitudinal direction L can therefore be effectively adjusted by varying the water vapor diffusion resistance of the barrier layers 4.

In this exemplary embodiment, the sealing tape sections 20 adjacent to a barrier layer 4 can be bonded to each other by barrier layer 4 itself; i.e., each section is adhered to the barrier layer 4. It is also possible, however, to provide an adhesive layer on the top surface 6 and/or the bottom surface 8 of the sealing tape 2 to bond the sealing tape sections 20 together in the longitudinal direction. For example, this adhesive layer can be formed by the adhesive layer 15 on the bottom surface 8 of the sealing tape 2 for attachment to the frame element.

In an alternative embodiment, the plurality of barrier layers 4 extend only part of the way between the top surface 6 and the bottom surface 8 of the sealing tape 2. The barrier layers 4 then start from one of the two surfaces 6, 8, i.e., either from the top surface 6 or the bottom surface 8, and proceed toward whichever surface is opposite, i.e., either the top surface 6 or the bottom surface 8, over such a distance that a bridge of foam remains between the respective barrier layer and the opposite surface. The bridge or web of foam connects two adjacent sealing tape sections 20. It is therefore possible for water vapor to diffuse in the longitudinal direction L between two adjacent sealing tape sections 20 through these bridges of foam and around the associated barrier layer 4. The foam bridges should therefore be made as small as possible. Preferably, the bridges have a thickness of no more than 1-2 mm. The predominant part of the cross section in this area then comprises a barrier layer 4, as a result of which the disadvantages of this embodiment are minimized. In contrast, however, this embodiment offers the considerable advantage that the sealing tape is easier to produce, as will be described below with reference to FIGS. 2 and 3.

Figure 2:
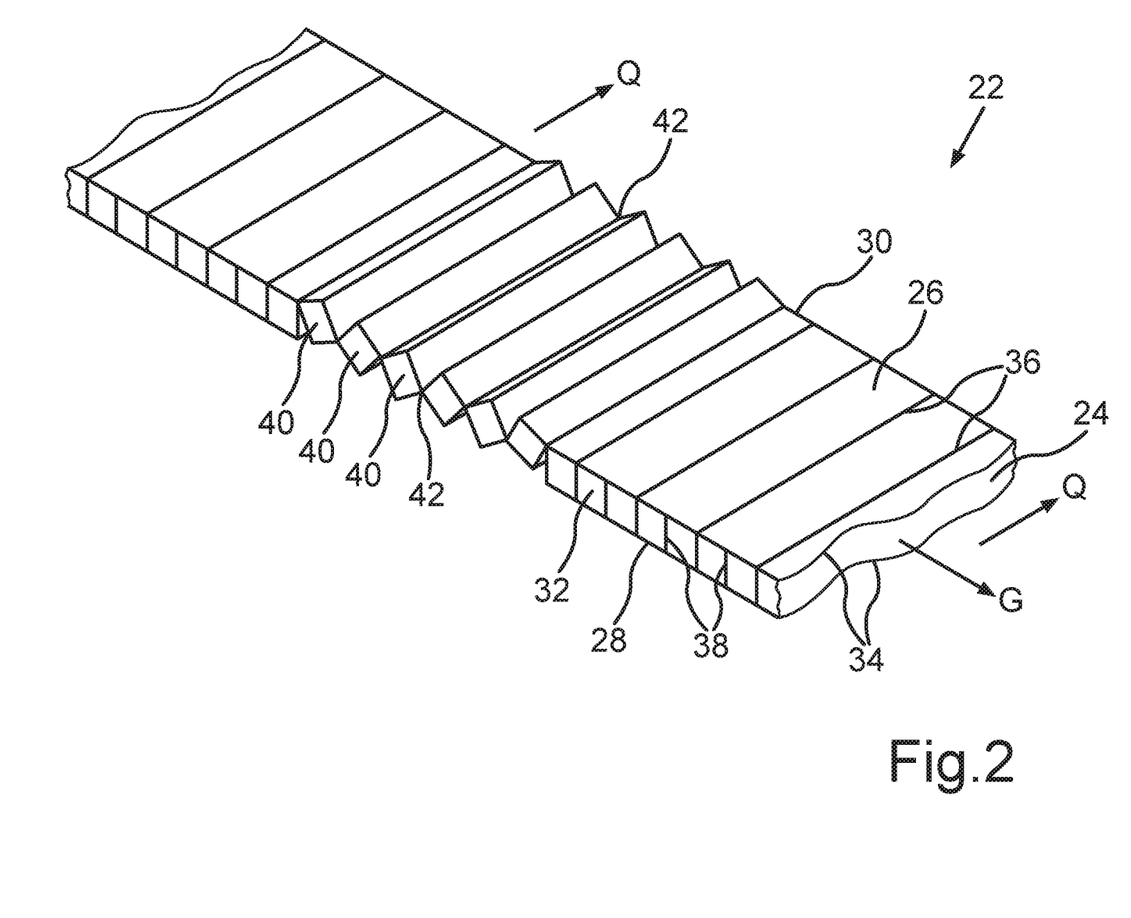
FIG. 2 shows a foam-barrier layer web for producing a sealing tape of an embodiment of the sealing tape roll according to the invention.

FIG. 2 shows an isometric view of part of a foam-barrier layer web 22 for producing a sealing tape 2 for a sealing tape roll 1 according to an aspect of the present invention. The foam-barrier layer web 22 comprises a foam web 24. The foam web 24 comprises a top surface 26, a bottom surface 28, two side surfaces 30, 32 connecting the top surface 26 and the bottom surface, and a longitudinal direction G, which is parallel to the bottom surface 28 and to the side surfaces 30, 32 of the foam web 24. The foam-barrier layer web 22 also comprises a barrier layer material 34 on at least one of the top surface 26 and the bottom surface 28. In the embodiment shown here, a barrier layer material 34 has been applied to the top surface 26 and to the bottom surface 28 of the foam web 24.

To produce a sealing tape 2 with interior barrier layers 4, a plurality of first cuts 36 and a plurality of second cuts 38 are introduced into the foam-barrier layer web 22. The first cuts 36 are introduced into the top surface 26 of the foam web 24 in a transverse direction Q of the foam web 24, extend continuously between the side surfaces 30, 32 of the foam web 24, and are preferably perpendicular to both, the top surface 26 and to the side surfaces 30, 32. If a barrier layer material 34 has been applied to the top surface 26 of the foam web 24, the first cut 36 passes through this barrier layer material 34. The second cuts 38 are introduced into the bottom surface 28 of the foam web 24 in the transverse Q with an offset in the longitudinal direction G to the first cuts 36. The second cuts 38 extend continuously between the side surfaces 30, 32 of the foam web 24 and are preferably perpendicular to both, the bottom surface 28 and to the side surfaces 30, 32. If a barrier layer material 34 has been applied to the bottom surface 28 of the foam web 24, the second cuts 36 pass through this barrier layer material 34. As a result, parallel strips 40 of the foam-barrier layer web 22 are formed.

The first and second cuts 36, 38 are preferably at equal distances apart from each other. The indications "first" and "second" are not intended to define the chronological sequence in which the cuts are introduced into the foam-barrier layer web. For example, the second cuts could also be introduced before the first cuts are introduced. Alternatively, all of the cuts 36, 38 could also be introduced simultaneously into the foam-barrier layer web.

The first and second cuts 36, 38 do not pass all the way through the foam-barrier layer web 22. Instead, a connecting area 42 remains between two adjacent strips 40.

Figure 3:
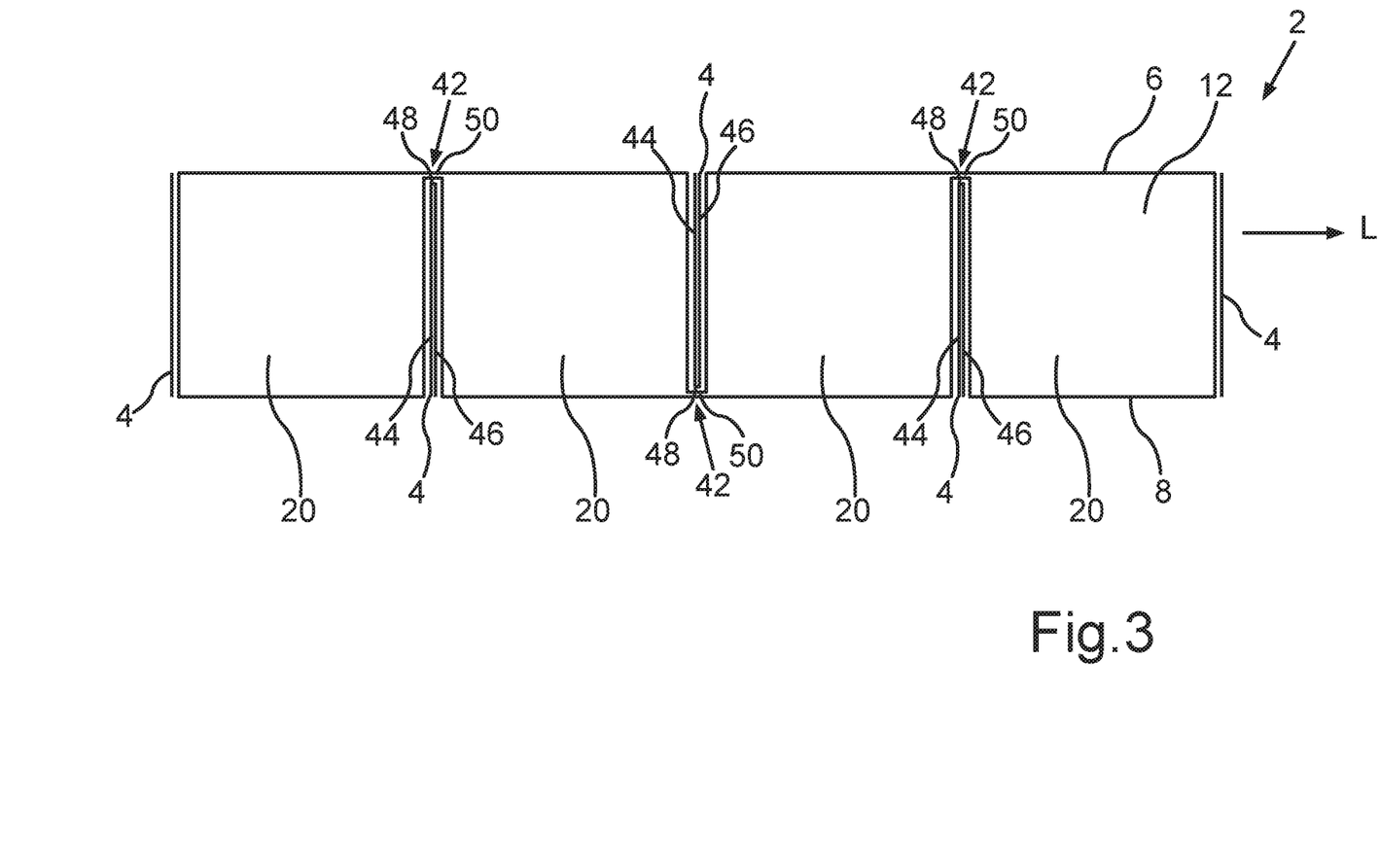
FIG. 3 shows a cross-sectional view of a sealing tape produced according to FIG. 2.

If the first and second cuts 36, 38 pass completely through the foam web 24, a connecting area 42 can be formed, in the case of a first cut 36, only by the barrier layer material 34 on the bottom surface 28, and, in the case of a second cut 38, only by the barrier layer material 34 on the top surface 26 of the foam web 24. If the first and second cuts 36, 38 do not pass all the way through the foam web 24, a foam bridge or web remains at the end of each cut, as can be seen in FIG. 3. The connecting area 42 then comprises this foam bridge. If a foam bridge is present, it is not necessary to provide a barrier layer material 34 or any other manner to connect the adjacent strips 40. On the contrary, providing only at least one barrier layer material 34 is enough to form a barrier layer 4. A connecting area 42, however, can also comprise a foam bridge and a barrier layer material 34.

To produce a sealing tape 2 with interior barrier layers 4, the strips 40 are folded over along the connecting areas 42 in such a way that subsections of the top surface 26 of the foam web 24 adjacent to a common connecting area 42 lie opposite each other, and subsections of the bottom surface 28 of the foam web 24 adjacent to a common connecting area 42 lie opposite each other. The individual sections of the barrier layer material 34 formed by the first and/or second cuts 36, 38 are thereby arranged in the interior of the sealing tape 2, and each one forms a barrier layer 4, as can be seen in FIG. 3. If the web with interior barrier layers 4 formed from the foam-barrier layer web 22 is wider than desired for the sealing tape 2 to be produced, the web can be separated into a plurality of sealing tapes by introducing cuts in the longitudinal direction, i.e., into the top and/or bottom surface of the web parallel to the side surfaces.

FIG. 3 shows a cross-sectional view, in the longitudinal direction L of the sealing tape 2, of a sealing tape 2 which can be wound up into a sealing tape roll 1. The sealing tape 2 can be produced as described above with reference to FIG. 2. The sealing tape 2, however, can also be produced by providing a foam strip, introducing cuts in its top and/or bottom surface, and by inserting a barrier layer into each of these cuts. The skilled person is familiar with alternative possibilities for forming a sealing tape with interior barrier layers.

According to FIG. 3, the sealing tape 2 comprises a plurality of sealing tape sections 20, which, in the unwound state of the sealing tape 2, are arranged behind on another in a row in the longitudinal direction L. Between each pair of adjacent sealing tape sections 20, a barrier layer 4 is arranged. Each barrier layer 4 can have a single-ply or a multi-ply configuration.

In the preferred embodiment shown, at least one barrier layer 4 comprises two barrier layer sections 44, 46, wherein a barrier layer section 44, 46 is bonded to each of the sealing tape sections 20 adjacent to the barrier layer 4 respectively. This bond can be achieved by, for example, laminating or attaching the barrier layer material 34 onto the foam web 24 or by adhering the barrier layer material 34 to the foam web 24. The two barrier layer sections 44, 46 rest against each other by their facing surfaces. The two barrier layer sections 44, 46 can also be adhered to each other. For example, the sealing tape 2 can be heated to bond the barrier layer sections 44, 46 together, or an adhesive can be used, which is applied to the facing surfaces of the barrier layer sections 44, 46. Alternatively, the barrier layer material 34 itself could have adhesive properties, so that the barrier layer sections 44, 46 adhere to each other. It is conceivable that, after fusing the two barrier layer sections 44, 46 together, at least certain areas of these sections can no longer be distinguished optically from each other.

In the embodiment shown, the two barrier layer sections 44, 46 each form a leg of the at least one barrier layer 4. These two legs are connected to each other by a connecting section 48 of the at least one barrier layer 4. The connecting section 48 is preferably an integral part of the barrier layer sections 44, 46. As can be seen from FIGS. 2 and 3 in combination, a barrier layer 4 with two barrier layer sections 44, 46 and with a connecting section 48 is preferably formed in that two adjacent strips 40 of the foam-barrier layer web 22 are folded over around a connecting area 42. The barrier layer material 34 applied to the strips 40 is thus folded into the interior of the web, so that the sections of the barrier layer 34 previously assigned to the top surface 26 or the bottom surface 28 of the foam-barrier layer web 22 are now facing each other inside the sealing tape 2. As a result of this folding process, the barrier layer material 34 is folded along the connecting areas 42, so that, in the interior of the sealing tape 2, a barrier layer 4 is created which is substantially perpendicular to the bottom surface 8 and which comprises two leg-like barrier layer sections 44, 46. The barrier layer sections 44, 46 are then connected by a connecting section 48 in the area of the connecting area 42. The connecting section 48 is therefore formed at one end of each of the leg-like barrier layer sections 44, 46. A barrier layer 4 with two barrier layer sections 44, 46 and a connecting section 48, however, can also be formed by inserting a V-shaped or U-shaped film into a previously produced cut in the sealing tape.

In the exemplary embodiment shown here, however, the connecting section 48 of the barrier layer 4 is formed by bending or folding the barrier layer 4 or the barrier layer material 34 along the connecting area 42. It is therefore preferably U-shaped or V-shaped and arranged in the area of the top surface 6 or the bottom surface 8 of the sealing tape 2. A U-shape is obtained, for example, when the barrier layer 4 is folded over along the connecting area 42 without becoming creased or experiencing pressure in the longitudinal direction L. If the barrier layer 4 becomes creased in the area of the connecting area 42 or if the sealing tape 2 is subjected to pressure or compression in the longitudinal direction L, the connecting section 48 will tend to acquire a V-shape. Alternative geometric configurations of the connecting section 48 are possible. All of these geometries of the connecting section 48 mentioned above can be described as a loop, even if the legs of the loop are usually pressed against each other.

As can be seen in FIG. 3, the connecting sections 48 are arranged in the area of the top surface 6 or of the bottom surface 8 of the sealing tape 2. Depending on the depth of the first and second cuts 36, 38, there remains, if desired, a foam web or bridge 50 between two adjacent strips 40 or sealing tape sections 20, the thickness of which can be selected as desired. If the connecting areas 42 are formed only by the connecting sections 48 of the barrier layers 4, these form, in the area of the connecting areas 42, a kind of hinge joint, which connects the adjacent strips 40 together in an articulated manner. It must be taken into consideration however, that as the thickness of the foam web 50 increases, the subsequent folding of the strips 40 in the area of the connecting areas 42 comprising a foam bridge 50 becomes more difficult. The foam bridges 50 are particularly suitable to protect the barrier layers 4 or the barrier layer material 34 from damage during the introduction of the first and second cuts 36, 38.

To allow the strips 40 to be folded over easily along the connecting areas 42, the connecting areas 42 should be made as thin as possible. The thinnest possible connecting areas 42 are formed by the barrier layer material 34 only. However, because the barrier layer material 34 can be severed even if only minor deviations occur during introduction of the cuts, it is advisable to allow thin foam bridges 50 to remain in addition, which contribute to the connecting areas 42 and protect the barrier layer material 34 from being severed. The at least one foam bridge 50 preferably has a maximum thickness of 10 mm, more preferably of 5 mm, and even more preferably of 1-2 mm. If no bridges 50 of foam material are formed, the connecting sections 48 can coincide with the top surface 6 or bottom surface 8 of the sealing tape 2.

As can also be seen from FIGS. 2 and 3 in combination, in this preferred embodiment each of the at least two barrier layers 4 comprises two barrier layer sections 44, 46 and a connecting section 48. The connecting sections 48 alternate, in the longitudinal direction of the sealing tape 2, between the area of the top surface 6 and the area of the bottom surface 8 of the sealing tape 2. This results from the strips 40 of the foam-barrier layer web 22 being folded over in alternation around a connecting area 42 at the top surface 26 of the foam-barrier layer web 22 and a connecting area 42 at the bottom surface 28 of the foam-barrier layer web 22. Even if the barrier layers 4 are configured with only a single ply but do not pass all the way through the sealing tape 2, they preferably extend into the sealing tape from the top surface 6 and the bottom surface 8 in alternation in the longitudinal direction L.

Figure 4:
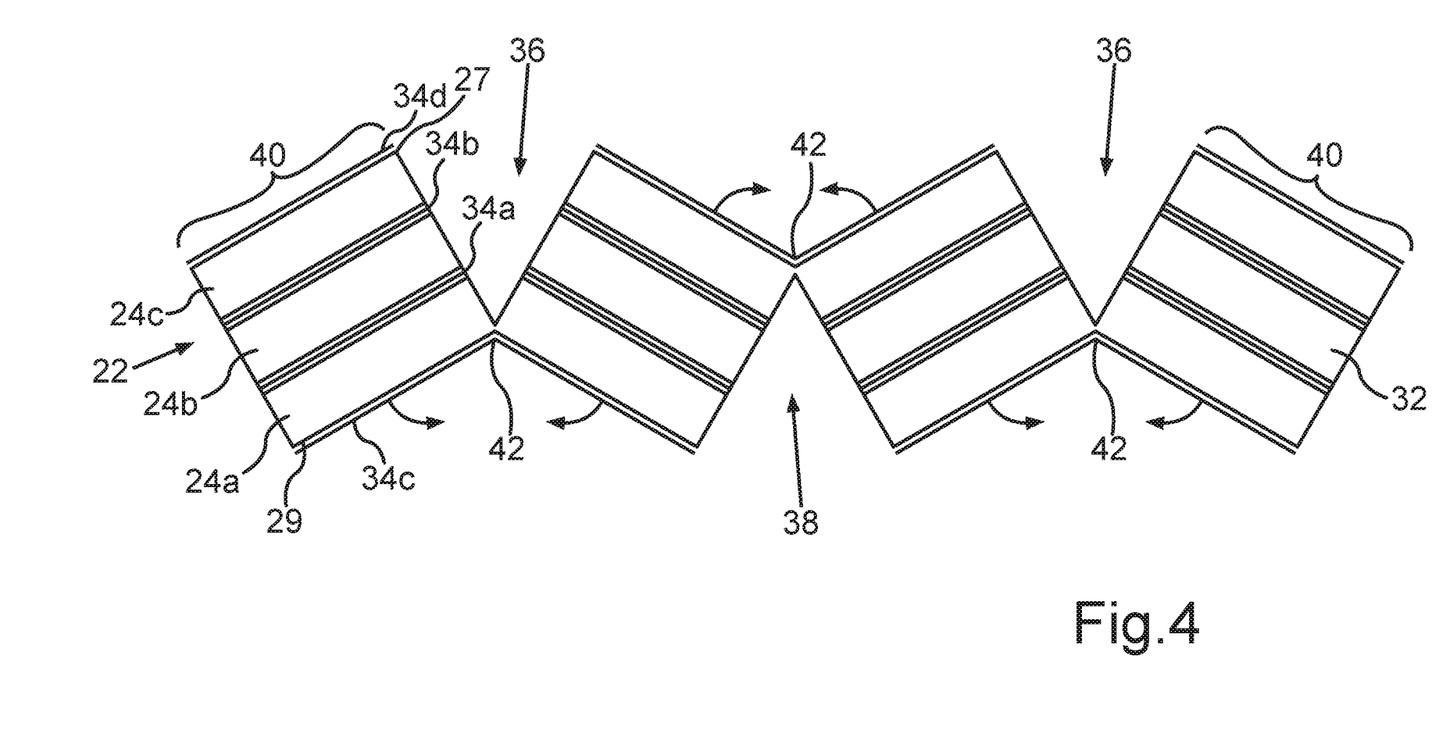
FIG. 4 shows a foam-barrier layer web for producing a sealing tape of an alternative embodiment of the sealing tape roll according to the invention.
Figure 5:
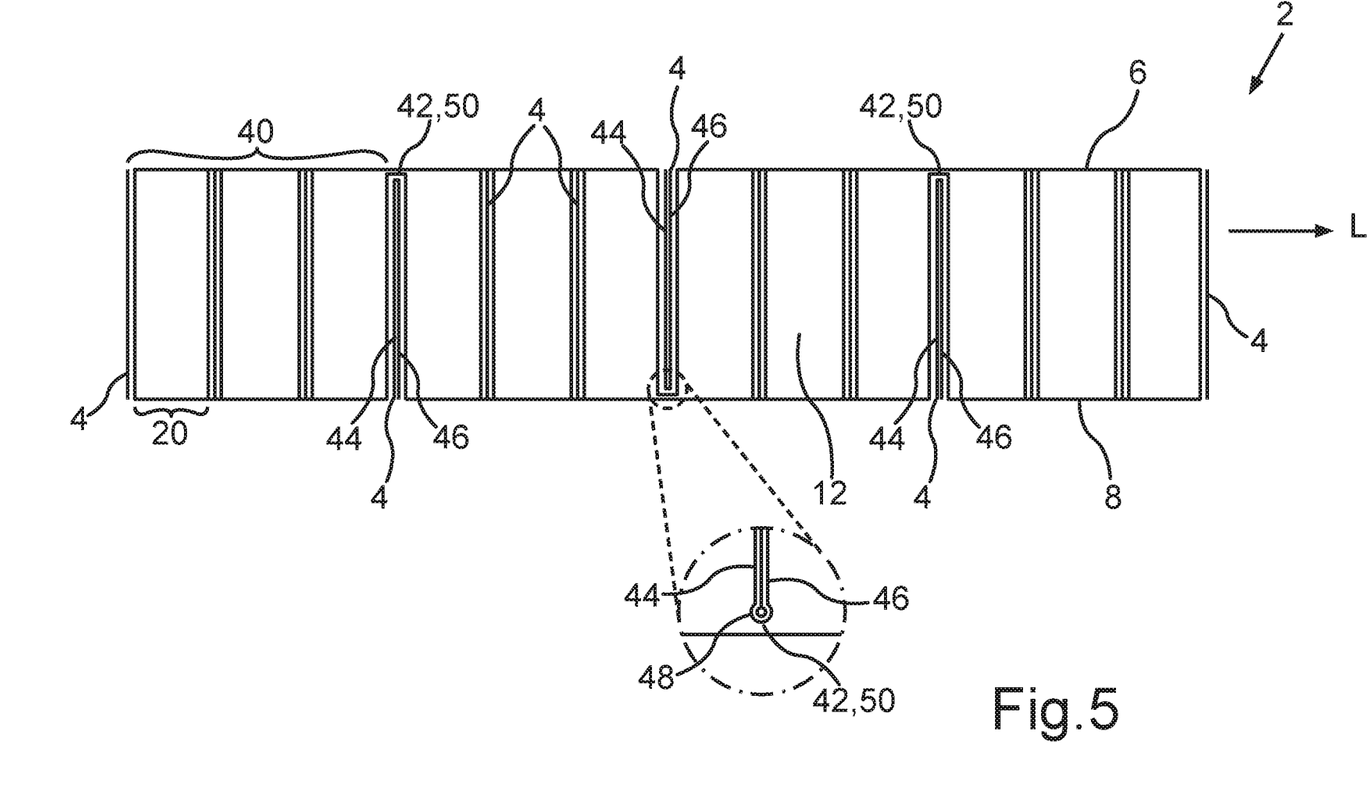
FIG. 5 shows a cross-sectional view of the sealing tape produced according to FIG. 4.

FIGS. 4 and 5 show an alternative embodiment, in which a sealing tape 2 is formed by a multi-ply foam-barrier layer web 22. The multi-ply foam-barrier layer web 22 comprises a first foam web 24a, a second foam web 24b, and a third foam web 24c, which are arranged on top of each other. A ply of barrier layer material 34a, b is arranged between each of two adjacent foam webs 24a, b, c. Thus a first ply of barrier layer material 34a is arranged between the first foam web 24a and the second foam web 24b, and a second ply of barrier layer material 34b is arranged between the second foam web 24b and the third foam web 24c. An additional ply of barrier layer material 34c, d may be arranged at least on the top surface 27 or the bottom surface 29 of the foam-barrier layer web 22. In the present case, an additional ply is arranged on both, the top surface 27 and on the bottom surface 29. In this way, multi-ply foam-barrier layer webs 22 with any desired number of foam webs 24 and any desired number of plies of barrier layer material 34 can be obtained. The foam webs 24a, b, c are bonded to the associated plies of barrier layer material 34a, b, c, d by methods familiar to the skilled person.

First cuts 36 are introduced into the top surface 27 of the foam-barrier layer web 22, and second cuts 38 are introduced perpendicularly into the bottom surface 29 of the foam-barrier layer web 22. With respect to the introduction of the first and second cuts 36, 38, reference is made to the explanations of FIGS. 2 and 3, which are also applicable to this exemplary embodiment.

In this way, strips 40, arranged behind one another in a row in the longitudinal direction G, are formed from the foam-barrier layer web 22, wherein each pair of successive strips 40 are connected to each other by a connecting area 42. By folding the strips 40 over along the connecting areas 42, a sealing tape 2 according to FIG. 5 is formed, wherein the sections of the top or bottom surface 27, 29 of the foam-barrier layer web 22 are arranged inside the sealing tape 2. The cut surfaces of the first and second cuts 36, 38 then form the top and bottom surface 6, 8 of the sealing tape 2 respectively.

As can be derived from a joint consideration of FIGS. 4 and 5, the plies of the barrier layer material 34 which are folded over along a connecting area 42 form barrier layers 4 within the sealing tape 2, each having two barrier layer sections 44, 46 and a connecting section 48, as previously described with reference to FIG. 3. Barrier layer material plies 34 which have been cut through by the first and second cuts 36, 38 and are therefore not folded (here, therefore, sections of the first and second barrier layer material plies 34a, b of the individual strips 40), each form a single-ply barrier layer 4 in the sealing tape 2, which layer extends from the top surface 6 to the bottom surface 8 of the sealing tape 2.

In this way, a sealing tape is obtained in which at least one single-ply barrier layer 4 is arranged between the at least two barrier layers 4 comprising two barrier layer sections 44, 46 and a connecting section 48. This single-ply barrier layer comprises only one barrier layer section and extends from the top surface 6 to the bottom surface 8 of the sealing tape 2.

In the detail view of FIG. 5, the barrier layer sections 44, 46 and the connecting section 48 of a barrier layer 4 are shown on a larger scale. The connecting section 48 is configured as a loop, here substantially having a U-shape. The foam bridge 50 can also be seen, which connects the two adjacent sealing tape sections 20 together and forms part of the connecting area 42.

FIGS. 6a and 6b each show a cross section through a part of a building, which comprises a building wall 52, a frame element 54, and a sealing tape 2. FIG. 6a shows a cross section through the building part and the sealing tape 2 in a vertical plane, and FIG. 6b shows a cross section through the building part and the sealing tape 2 in a horizontal plane.

The frame element 54 is inserted into a masonry opening in the building wall 52. A joint 56 is formed between the facing surfaces of the building wall 52 or masonry opening and the frame element 54. This joint 56 extends around the frame element 54 and is to be sealed. The sealing tape 2 is to be arranged in this joint 56. To facilitate installation, the sealing tape 2 is preferably already attached to the frame element 54 before the frame element 54 is inserted into the masonry opening. For this purpose, the bottom surface 8 of the sealing tape 2 comprises an adhesive layer 15, by which sealing tape 2 is attached to the outside surface of the frame element 54 facing the joint 56. Alternatively, the bottom surface 8 of the sealing tape 2 could also be attached by the adhesive layer 15 to the side of the building wall facing the joint 56.

As can be derived from FIG. 6a, the sealing tape 2 is arranged in a standard manner within the joint 56 in such a way that the bottom surface 8 of the sealing tape 2 rests against the frame element 54, the top surface 6 of the sealing tape 2 rests against the building wall 52, and the side surfaces 10, 12 are facing the interior side of the room and the exterior side of the room. The sealing tape 2 extends in the longitudinal direction L around the frame element 54. In contrast to conventional sealing tapes, however, the barrier layers 4 extend in a plane extending from the frame element 54 toward the building wall 52 and from the interior side 62 of the room toward the exterior side 60. The barrier layers 4 therefore do not have a substantial insulating or sealing effect on the interior side 62 versus the exterior side 60 in the functional direction F of the sealing tape 2. The barrier layers of conventional sealing tapes extend, in contrast, from the frame element 54 toward the building wall 52 and parallel to the side surfaces 10, 12, so that they are perpendicular to the functional direction F over the entire cross section of the joint 56 and thus seal the interior side of the room against the exterior side. Such barrier layers can be provided in addition to the barrier layers 4.

FIG. 6b is a cross-sectional view, in a horizontal plane, through a barrier layer 4. It can be seen that the barrier layer 4 extends through the sealing tape 2 from the interior side 60 of the room to the exterior side 62 and over at least most of the distance from the frame element 54 to the building wall 52. Barrier layers of conventional sealing tapes would be perpendicular to the plane of the drawing in this view, so that they can seal off the interior side 62 against the exterior side 60.

It is obvious that the sealing tape roll 1 can also be configured in a manner which differs from the preferred embodiments shown and described herein. In particular, the barrier layers 4 do not necessarily have to be perpendicular to the top surface 6, to the bottom surface 8, and to the side surfaces 10, 12 of the sealing tape 2. Instead, the plurality of barrier layers 4, in the unwound state of the sealing tape 2, can also be perpendicular to the top surface and/or to the bottom surface and at a slant to the side surfaces 10, 12. In this way, it becomes possible to exert an influence not only on diffusion within the sealing tape 2 in the longitudinal direction L but also to a certain extent on diffusion in the functional direction F of the sealing tape 2, i.e., transversely to the longitudinal direction L.

Alternatively, the plurality of barrier layers 4, in an unwound state of the sealing tape 2, can also be at a slant to the top surface 6, to the bottom surface 8, and to the side surfaces 10, 12. This wide variety of ways in which the barrier layers 4 can be arranged inside the sealing tape 2 within the scope of the present invention increases the number of possible variations or adjustments of the properties of the sealing tape 2. The methods for producing sealing tape rolls 1 can thus also be adapted in any way desired.

However, the plurality of barrier layers 4 separate individual sealing tape strips 20 arranged behind one another in a row in the longitudinal direction L of the sealing tape 2 as completely as desired from each other in order significantly reduce or prevent the diffusion of water vapor within the sealing tape 2 in the longitudinal direction L of the sealing tape 2.

If one or more of the barrier layers described herein extend only part of the way through the sealing tape, they extend over at least 50% of the cross section of the sealing tape, preferably over at least 75%, and even more preferably over at least 90% of the cross section of the sealing tape in the direction in question. In particular, the plurality of barrier layers 4 extend over at least 50%, preferably over at least 75%, and more preferably over at least 90% of the width of the sealing tape roll 1 between the opposite end surfaces 16, 18 of the sealing tape roll 1. A barrier layer parallel to the side surfaces extends over at least 50%, preferably over at least 75%, and more preferably over at least 90% of the thickness of the sealing tape roll 1 between the top surface 6 and the bottom surface 8 of the sealing tape roll 1.

It is obvious that the explanations given herein concerning the sealing tapes and barrier layers apply to all of the embodiments described herein and that individual features of the various embodiments can be combined with each other in any way desired.

The invention claimed is:

1. A sealing tape roll of a sealing tape,
   wherein the sealing tape is of flexible, compressible foam and comprises a plurality of interior barrier layers,
   wherein the sealing tape comprises a top surface, a bottom surface, and two side surfaces connecting the top surface and the bottom surface, and a longitudinal direction, which is parallel to the bottom surface and to the side surfaces;
   wherein the sealing tape is wound up into the sealing tape roll around an axis transverse to the longitudinal direction of the sealing tape in such a way that the top surface of one turn rests against the bottom surface of an adjacent turn of the sealing tape roll, and the side surfaces of the sealing tape form two opposite end surfaces of the sealing tape roll, wherein the sealing tape roll has a width between one end surface and an opposite end surface of the sealing tape roll;
   wherein the sealing tape comprises a plurality of sealing tape sections, which, in an unwound state of the sealing tape, are arranged behind one another in a row in the longitudinal direction, wherein a barrier layer of the plurality of interior barrier layers is arranged between each pair of adjacent sealing tape sections of the plurality of sealing tape sections, the plurality of interior barrier layers are formed of a film-like material or an adhesive; and
   wherein the plurality of interior barrier layers extend over at least 50% of the width of the sealing tape roll.

2. The sealing tape roll according to claim 1 wherein the plurality of interior barrier layers are perpendicular to the bottom surface and to the side surfaces, so that they extend axially relative to the sealing tape roll.

3. The sealing tape roll according to claim 1 wherein in the unwound state of the sealing tape, the plurality of interior barrier layers are arranged at a slant to the top surface and to the bottom surface and are perpendicular to the side surfaces.

4. The sealing tape roll according to claim 1 wherein in the unwound state of the sealing tape, the plurality of interior barrier layers are perpendicular to the bottom surface and arranged at a slant to the side surfaces.

5. The sealing tape roll according to claim 1 wherein in the unwound state of the sealing tape, the plurality of interior barrier layers are arranged at a slant to the top surface, to the bottom surface, and the two side surfaces.

6. The sealing tape roll according to claim 1 wherein the plurality of interior barrier layers extend only partially between the top surface and the bottom surface of the sealing tape.

7. The sealing tape roll according to claim 1 wherein at least one barrier layer of the plurality of interior barrier layers comprises two barrier layer sections, wherein each barrier layer section rests flat against a sealing tape section adjacent to the at least one barrier layer.

8. The sealing tape roll according to claim 7 wherein the two barrier layer sections are adhered to each other.

9. The sealing tape roll according to claim 7 wherein the two barrier layer sections each form a leg of the at least one barrier layer, and the two legs are connected to each other by a connecting section of the at least one barrier layer.

10. The sealing tape roll according to claim 9 wherein the connecting section of the at least one barrier layer has a U-shape or a V-shape and is arranged in an area of the top surface or of the bottom surface of the sealing tape.

11. The sealing tape roll according to claim 9 wherein at least two barrier layers of the plurality of interior barrier layers each comprise the two barrier layer sections and the connecting section, and the connecting sections of the at least two barrier layers succeeding each other in the longitudinal direction of the sealing tape alternate between being arranged in an area of the top surface and in an area of the bottom surface of the sealing tape.

12. The sealing tape roll according to claim 1 wherein, in the unwound state of the sealing tape, the barrier layers are parallel to each other.

13. The sealing tape roll according to claim 1 wherein the bottom surface of the sealing tape comprises an adhesive layer for attaching the sealing tape to a frame element.

14. The sealing tape roll according to claim 1 wherein the plurality of interior barrier layers pass continuously from one end surface of the sealing tape roll to the opposite end surface of the sealing tape roll.

15. A sealing tape roll of a sealing tape,
wherein the sealing tape is of flexible, compressible foam and comprises a plurality of interior barrier layers,
wherein the sealing tape comprises a top surface, a bottom surface, and two side surfaces connecting the top surface and the bottom surface, and a longitudinal direction, which is parallel to the bottom surface and to the side surfaces;
wherein the sealing tape is wound up into the sealing tape roll around an axis transverse to the longitudinal direction of the sealing tape in such a way that the top surface of one turn rests against the bottom surface of an adjacent turn of the sealing tape roll, and the side surfaces of the sealing tape form two opposite end surfaces of the sealing tape roll, wherein the sealing tape roll has a width between one end surface and an opposite end surface of the sealing tape roll;
wherein the sealing tape comprises a plurality of sealing tape sections, which, in an unwound state of the sealing tape, are arranged behind one another in a row in the longitudinal direction, wherein a barrier layer of the plurality of interior barrier layers is arranged between each pair of adjacent sealing tape sections of the plurality of sealing tape sections, the plurality of interior barrier layers extend continuously from the top surface to the bottom surface of the sealing tape; and
wherein the plurality of interior barrier layers extend over at least 50% of the width of the sealing tape roll.

16. The sealing tape roll according to claim 15 wherein the plurality of interior barrier layers are perpendicular to the bottom surface and to the side surfaces, so that they extend axially relative to the sealing tape roll.

17. The sealing tape roll according to claim 15 wherein in the unwound state of the sealing tape, the plurality of interior barrier layers are arranged at a slant to the top surface and to the bottom surface and are perpendicular to the side surfaces.

18. The sealing tape roll according to claim 15 wherein in the unwound state of the sealing tape, the plurality of interior barrier layers are perpendicular to the bottom surface and arranged at a slant to the side surfaces.

19. The sealing tape roll according to claim 15 wherein in the unwound state of the sealing tape, the plurality of interior barrier layers are arranged at a slant to the top surface, to the bottom surface, and the two side surfaces.

\* \* \* \* \*